United States Patent [19]
Valibouse et al.

[11] 4,437,989
[45] Mar. 20, 1984

[54] APPARATUS FOR COLLECTING SUBSTANCES FLOATING ON AN EXPANSE OF LIQUID

[75] Inventors: Bernard Valibouse, Grenoble; Albert Bonazzi, Gieres, both of France

[73] Assignee: Societe Anonyme Dite: Alsthom-Atlantique, Paris, France

[21] Appl. No.: 319,762

[22] Filed: Nov. 9, 1981

[30] Foreign Application Priority Data

May 30, 1980 [FR] France .................... 80 12062

[51] Int. Cl.³ .................................. B01D 23/00
[52] U.S. Cl. ....................... 210/242.3; 210/923
[58] Field of Search ............. 210/242.3, 923, 776, 210/241, 242.2, 242.1

[56] References Cited

U.S. PATENT DOCUMENTS

| 61,880 | 2/1867 | Serrell | 210/242.3 |
| 3,670,896 | 6/1972 | Hale, Jr. et al. | 210/923 |
| 3,966,615 | 6/1976 | Petchul | 210/242.1 |

FOREIGN PATENT DOCUMENTS

| 2070016 | 9/1971 | France . | |
| 2200859 | 4/1974 | France . | |
| 54-70588 | 6/1979 | Japan | 210/242.3 |

Primary Examiner—Peter A. Hruskoci
Assistant Examiner—Sharon T. Cohen
Attorney, Agent, or Firm—Sughrue, Mion, Zinn, Macpeak & Seas

[57] ABSTRACT

The apparatus includes a separator (2) and a collector trough (3) which are driven by the movement of a ship (1) wherein according to the invention, the separator is constituted by a long narrow plate which extends along the outside of the ship and forms an acute angle $\theta$ relative to the direction of movement of the ship, said separator plate being associated with means which allow it to be kept partially submerged and being inclined at an angle of incident $\alpha$ relative to the surface of the water, the collector being constituted by a trough (3) placed against the side of the ship and communicating with an inner chamber. The invention applies more particularly to recuperating hydrocarbons split out at sea.

5 Claims, 5 Drawing Figures

APPARATUS FOR COLLECTING SUBSTANCES FLOATING ON AN EXPANSE OF LIQUID

FIELD OF INVENTION

The invention relates to an apparatus for collecting floating substances such as hydrocarbons spilt on the surface of an expanse of liquid such as the sea.

BACKGROUND OF THE INVENTION

Conventional collecting apparatus is either static or dynamic. In the dynamic case, the apparatus is installed on a ship which operates at low speed. This entails a low collecting speed. Further, such apparatus is effective in calm weather but is not so effective in rough water.

SUMMARY OF THE INVENTION

The invention aims to provide an apparatus which is capable of operating rapidly and efficiently even in rough water. This result is achieved by keeping the units for separating the surface layer of floating hydrocarbons apart from the units which collect them in conjunction with the use of a relatively fast ship.

The invention therefore provides an apparatus for collecting substances floating on an expanse of liquid, said apparatus including at least one separator and one collector which are driven by the movement of a ship, characterized in that said separator is constituted by a structure formed by a long narrow plate which extends along the outside of the ship and forms an acute angle $\theta$ relative to the direction of movement of the ship, said separator plate being submerged over a part of its width and being inclined at an angle of $\alpha$ relative to the surface of the water, the collector including at least one trough placed against the side of the ship and communicating with a chamber.

According to a particular embodiment of the invention, said separator plate is flat.

According to another particular embodiment of the invention said separator plate is twisted along its whole length so as to make said angle $\alpha$ vary therealong.

According to another characteristic of the invention, said trough includes a first part which is slightly inclined relative to the horizontal and downwardly from the front to the rear relative to the direction of movement of the ship and a second part which is substantially vertical and is connected to the rear end of the first part and extends upwardly therefrom.

In accordance with a particularly advantageous embodiment of the present invention, such an apparatus includes a collector and a separator placed on each side of the ship.

The invention will be well understood from the description of an embodiment of the invention given hereinafter with reference to the accompanying drawing.

DESCRIPTION OF THE PREFERRED EMBODIMENT

Figure 1:
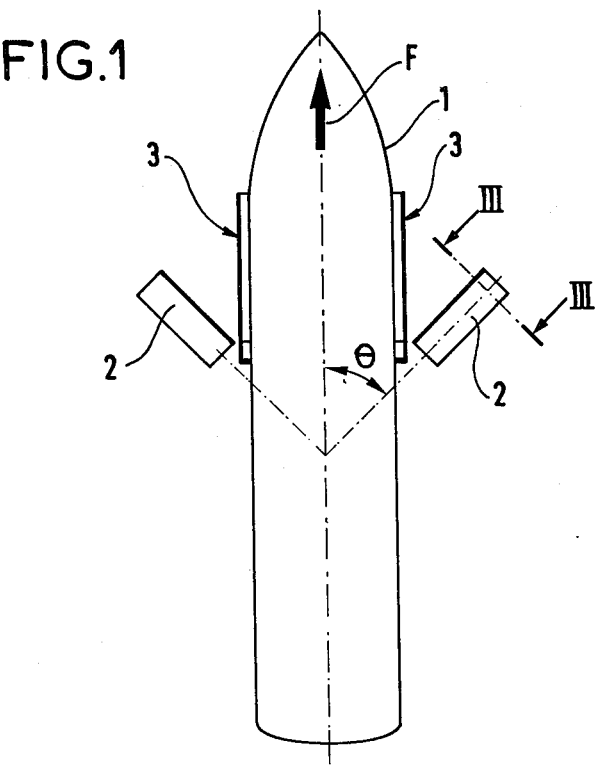
FIG. 1 schematically illustrates a top view which shows the principle of the invention.

FIG. 1 illustrates a ship or hull 1 moving in the direction of the arrow F. Separators 2 designed to concentrate and direct the layer of spilt liquid which floats on the surface of the water are located on either side of the ship.

Figure 3:
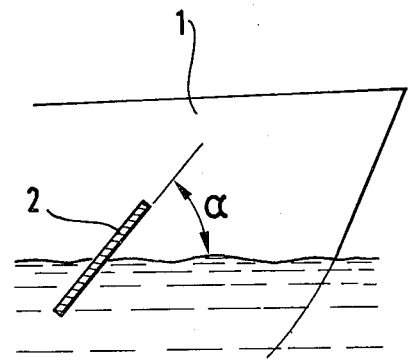
FIG. 3 illustrates a cross-section along line III—III of FIG. 1, showing the inclination of the separator relative to the surface of the water.

The spilt liquid is generally oil. The separators 2, each form an acute angle $\theta$ relative to the axis of the ship. A separator 2 is constituted for example by a flat rectangular plate and it is placed so as to form an angle $\alpha$ (FIG. 3) relative to the surface of the water so that under the combined effect of speed and of this angle of incidence $\alpha$, the surface layer of liquid rebounds towards the sides of the ship where the liquid is then collected by means of troughs 3 which perform the functions of collectors.

Figure 2:
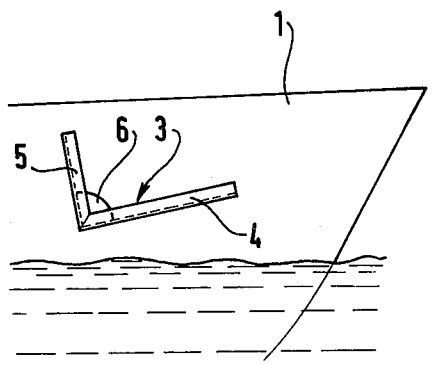
FIG. 2 schematically illustrates the collector in vertical elevation.

FIG. 2 illustrates one of these troughs which is made in two parts: a first part 4 which is slightly inclined relative to the horizontal, and a substantially vertical part 5. These two parts join together near a hole 6 which communicates with a tank inside the ship. When the liquid to be collected is a heavy hydrocarbon, small holes can be made in the troughs 3 so as to separate water from the hydrocarbon which remains in the troughs.

Since the distance which separates the separator 2 from the sides of the ship 1 varies along the separators 2 and the force of the rebounding flow depends on the angle of incidence $\alpha$, the separator 2 may be constituted by a twisted plate rather than by a flat plate so as to make the angle of incidence $\alpha$ vary along this plate.

Likewise, the separator plate 2 may have a concave cross-section like that of a scoop so as to improve separation and the curve can be calculated so as to optimize the stream of oil collected against the sides of the ship.

Likewise, the angles $\theta$ and $\alpha$ are determined by the person skilled in the art by experiment according to the speed of the ship, the depth of the separator plate in the water, etc.

Figure 4:
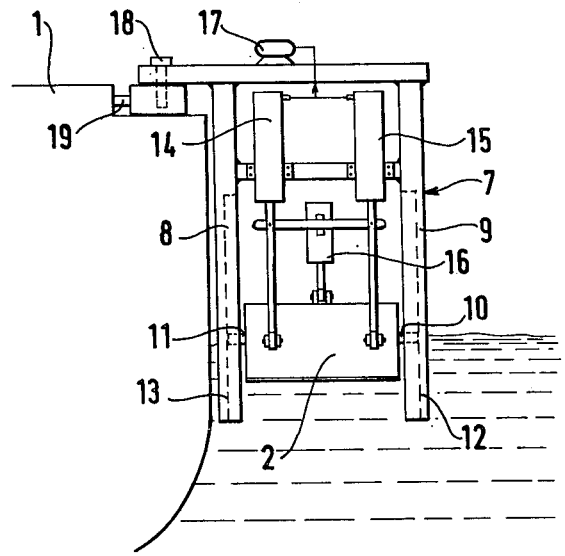
FIG. 4 schematically illustrates in vertical elevation a possible practical embodiment of the invention.
Figure 5:
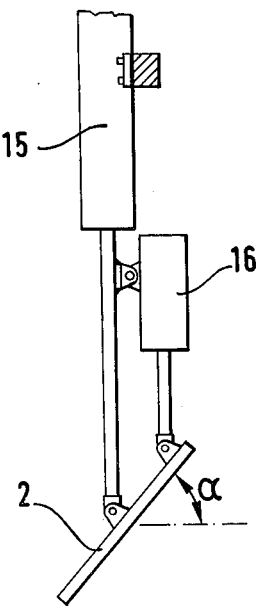
FIG. 5 is a vertical side elevation which illustrates a detail of FIG. 4.

FIGS. 4 and 5 show one way of connecting the separator 2 to the ship 1. The troughs are not shown in these figures.

The separator plate 2 is placed inside a gantry 7 and can slide between its two vertical uprights 8 and 9 due to the co-operation of studs 10 and 11 integral with the separator plate 2, which studs slide in grooves 12 and 13 in the vertical uprights. The depth of the separator plate 2 in the water is controlled by jacks 14 and 15 whose rods are hinged on the plate 2 on the line which runs between the studs 10 and 11.

The angle $\alpha$ of incidence of the separator plate 2 is set by a jack 16 whose body is connected to the rods of the jacks 14 and 15 so that the angle of incidence $\alpha$ does not vary as the jacks 14 and 15 extend their rods more or less.

For a given angle of incidence $\alpha$, the effort exerted against the separator plate 2 depends on the depth of this plate in the water. Since a constant depth is required whatever the condition of the sea, the depth chosen at the outset is regulated by measuring the oil pressure in the bodies of the jacks. For this purpose, a pressure sensor 17 measures this oil pressure and as a function of the variation thereof, a regulator, not illustrated, works the jacks 14 and 15.

The angle θ of the separator plate 2 relative to the axis of the ship is adjusted by pivoting the gantry 7 on a pin 18. Likewise, the assembly can be made to pivot on a pin 19 so as to raise the assembly onto the ship.

We claim:

1. An apparatus for removing and collecting a light liquid from a water surface and being borne by a ship hull moving through the water, said apparatus comprising:

a long narrow separator plate mounted to the outside of the ship hull, separate therefrom and extending lengthwise away from the ship hull and forming an acute angle θ forwardly in the direction of ship movement with the centerline of the ship hull, said separator plate being partially submerged widthwise within the water, a collector trough being mounted against the side of the ship's hull above the surface of the water laterally spaced inboard of said separator plate and ahead of the rear end of said separator plate for collecting said light liquid separated from the water surface, said collector trough communicating with a chamber internally of said ship's hull.

and wherein said partially submerged separator plate is inclined downwardly and rearwardly widthwise relative to the direction of hull movement at an acute angle α such that at a relatively fast hull speed, the light liquid rebounds against the bottom of the separator plate and is thrown forwardly and sidewise into the air toward the side of the ship hull and above the collector trough for separation from the water and collection thereby.

2. An apparatus according to claim 1, characterized in that said separator plate (2) is flat.

3. An apparatus according to claim 1, wherein said trough (3) includes a first part (4) which inclines downwardly relative to the horizontal and from front to rear relative to the direction of movement of the ship (1) and a second part (5) which is substantially perpendicular thereto and is connected to the rear end of the first part (4) and which extends upwardly therefrom.

4. An apparatus according to claim 1, characterized in that a separator and a trough collector are placed on each side of the ship.

5. An apparatus according to claim 1, wherein an opening within the ship hull communicates the trough with said chamber internally of the ship.

* * * * *